United States Patent Office 3,222,429
Patented Dec. 7, 1965

3,222,429
POLYMERIZATION PROCESS USING BENZOIN/ MONOCARBOXYLIC ACID CATALYST SYSTEM
Thomas Boyd, Des Peres, Mo., and Heinz J. Dietrich, Bethany, Conn., assignors to Monsanto Chemical Company, St. Louis, Mo., a corporation of Delaware
No Drawing. Filed Aug. 9, 1962, Ser. No. 215,810
11 Claims. (Cl. 260—880)

This invention relates to the polymerization of styrene-type monomers and more particularly relates to the use of a novel catalyst system in the polymerization of such monomers.

It is known that styrene-type monomers can be polymerized thermally or catalytically to prepare polymers having molecular weights and residual monomer contents which vary with certain reaction parameters, e.g., the catalyst concentration, the time and temperature of the reaction, etc. It is also known that the product normally has an undesirably high residual monomer content when the parameters of a mass polymerization process are controlled so as to prepare a molding-grade polystyrene, i.e., a polystyrene having a Staudinger average molecular weight in the range of about 40,000–100,000.

An object of the invention is to provide a novel process for polymerizing styrene-type monomers.

Another object is to provide a process for polymerizing styrene-type monomers in the presence of a novel catalyst system.

A further object is to provide a mass process for polymerizing styrene-type monomers to moldable polymers containing a minimum amount of residual monomer.

These and other objects are attained by (1) dissolving a catalytic mixture of benzoin and a monocarboxylic acid having a dissociation constant not higher than $1.0 \times 10^{-4}$ at 25° C. in a polymerizable material comprising a monovinyl aromatic hydrocarbon and/or an ar-halo monovinyl aromatic hydrocarbon and (2) heating to polymerize the polymerizable material, the polymerization being conducted at 180–220° C. during the finishing stage of the reaction.

When desired, the catalyst mixture can also include a monomer-soluble peroxy compound having a half-life of at least 10 hours in benzene at 100° C. This optional ingredient is particularly apt to be desirable when the invention is applied to a mass polymerization process utilizing the time-temperature cycle which is hereinafter defined as the cycle which should be employed when the reaction is intended to produce a moldable polymer having a minimum residual monomer content.

The following examples are given to illustrate the invention and are not intended as a limitation thereof. In the reactions described in these examples (1) quantities mentioned are quantities by weight unless otherwise specified, (2) the monovinyl aromatic monomers employed as starting materials are commercially-supplied monomers containing 0.001–0.0015% t-butyl catechol and varying amounts of the impurities normally present in commercially-supplied styrene-type monomers, and (3) aliquots of the same monomer sample are polymerized in any series of reactions proposed for direct comparison of results.

EXAMPLE I

Part A.—Control

Charge 100 parts of styrene to a suitable reaction vessel. Purge the vessel with nitrogen. Heat at 95° C. for 20 hours, then gradually raise the reaction temperature to 190° C. over a period of about 5 hours, and maintain the temperature at 190° C. for an additional 4 hours. The product has a Staudinger average molecular weight in the range of 40,000–80,000 and a residual monomer content of 1.37%.

Part B.—Control

Repeat Part A except for dissolving 0.28 part of stearic acid in the monomer charge. The product has a Staudinger average molecular weight in the range of 40,000–80,000 and a residual monomer content of 0.94%.

Part C

Prepare four products by repeating Part A except for dissolving 0.28 part of stearic acid and varying amounts of benzoin in the monomer charge. Each of the products has a Staudinger average molecular weight in the range of 40,000–80,000. The residual monomer contents of the products, together with the amounts of benzoin employed in their preparation, are shown below.

| Reaction Number | Benzoin (parts) | Residual Monomer percent |
|---|---|---|
| 1 | 0.022 | 0.53 |
| 2 | 0.065 | 0.77 |
| 3* | 0.22 | 1.17 |
| 4* | 0.65 | 1.73 |

\* Control.

The preceding example shows that benzoin, when employed in conjunction with a stearic acid-type compound, has a beneficial effect on the residual monomer content of the product when employed in concentrations of 0.02–0.08% and a negligible or detrimental effect on the residual monomer content when employed in higher concentrations. Similar results are observed when Example I is repeated except that:

(1) The time-temperature cycle employed for the reaction is (a) 24 hours at 90° C., followed by 3.5 hours at 90–185° C., followed by 1 hour at 185° C., (b) 24 hours at 90° C., followed by 6.25 hours at 90–185° C., followed by 1.5 hours at 185° C., or (c) 12 hours at 110–90° C., followed by 4.5 hours at 90–190° C., followed by 3 hours at 190° C.,
(2) 0.04 part of di-t-butyl peroxide is dissolved in the monomer charge to serve as a catalyst or catalyst component,
(3) The 0.28 part of stearic acid is replaced with 0.4 part of stearic acid, 0.1 part of benzoic acid, or 0.06 part of acetic acid, or
(4) The 100 parts of styrene are replaced with 100 parts of p-chlorostyrene, 100 parts of a mixture of o-, m-, p-methylstyrenes, a mixture of 85 parts of styrene and 15 parts of acrylonitrile, a mixture of 80 parts of styrene and 20 parts of methyl methacrylate, a mixture of 75 parts of styrene and 25 parts of alpha-methylstyrene or a solution of 10 parts of a rubbery butadiene-styrene (75:25) copolymer in 100 parts of styrene.

EXAMPLE II

Control

Repeat Parts B and C of Example I except for conducting the reactions isothermally at 90° C. The residual monomer contents of the products prepared in the presence of benzoin are substantially the same as the residual monomer content of the product prepared in the absence of benzoin.

The process of the invention comprises (1) dissolving a catalyst mixture consisting of benzoin, a weak organic acid, and an optional peroxy compound in a polymerizable material comprising a styrene-type monomer and (2) heating to cause polymerization, the process being conducted at 180–220° C. during the finishing stage of the reaction.

The reaction mixture should contain about 0.02–0.08% of benzoin, based on the weight of polymerizable material. Concentrations higher than about 0.08% are undesirable because they may have a detrimental effect on the residual monomer content as well as the color of the product.

The weak organic acid employed as a catalyst component can be any monocarboxylic acid having a dissociation constant not higher than $1.0 \times 10^{-4}$ at 25° C. Among the particularly suitable acids are acetic, hexanoic, benzoic, phenylacetic, isopropylbenzoic, and hexahydrobenzoic acids and, as a preferred embodiment of the invention, alkanoic acids containing 12–20 carbon atoms (i.e., lauric, tridecanoic, myristic, pentadecanoic, palmitic, margaric, stearic, nonadecanoic, and eicosanic acids). Stearic acid is especially preferred because of the brilliance it imparts to the molded polymers.

The reaction mixture should contain at least 0.05% of the weak organic acid, based on the weight of polymerizable material, and usually contains not more than 1% of the acid. Within the range of 0.05–1% and at higher concentrations, variation in the concentration of a particular acid seems to have no substantial effect on the molecular weights and residual monomer contents of the polymers formed by the reaction, but it is usually preferred to avoid concentrations higher than 1% in order to avoid undue yellowing of the polymer. Ordinarily, the reaction mixture will contain 0.1–0.6% of the acid.

The optional component of the catalyst mixture can be any monomer-soluble peroxy compound having a half-life of at least 10 hours in benzene at 100° C. Utilizable peroxy compounds include, e.g., hydrogen peroxide, di-t-butyl diperphthalate, t-butyl peracetate, t-butyl perbenzoate, dicumyl peroxide, di-t-butyl peroxide, 2,5-dimethyl-2,5-di(t-butylperoxy)hexane, 2,5-dimethyl-2,5-di(t-butylperoxy)hexyne-3, t-butyl hydroperoxide, cumene hydroperoxide, p-methane hydroperoxide, cyclopentane hydroperoxide, diisopropylbenzene hydroperoxide, p-t-butyl-cumene hydroperoxide, pinane, hydroperoxide, 2,5-dimethylhexane-2,5-dihydroperoxide, etc., and mixtures thereof.

The reaction mixture can contain up to 0.1% of the peroxy compound, based on the weight of polymerizable material. This optional component may be found desirable when a substantial amount of the polymerization is to be accomplished at temperatures at which such peroxy compounds are effective, e.g., when the process utilizes the time-temperature cycle hereinafter defined as the cycle to be employed in a mass process when the product is to be a moldable polymer containing a minimum amount of residual monomer. When included as a catalyst component, the peroxy compound is usually employed in concentrations of 0.01–0.1%, preferably 0.01–0.05%.

The catalyst mixtures of the invention are used in the polymerization of polymerizable materials comprising a monovinyl aromatic hydrocarbon and/or an ar-halo monovinyl aromatic hydrocarbon, e.g., styrene; vinyl naphthalene; ar-alkylstyrenes, such as o-, m-, and p-methylstyrenes, ar-ethylstyrenes, etc.; o-chlorostyrene; p-bromostyrene; 2-chloro-4-methylstyrene, etc., and mixtures thereof. Such monovinyl aromatic monomers, as is well known, normally contain minor amounts of impurities formed as by-products of the monomer synthesis or accumulated during storage. Since the presence of these impurities appears to be more desirable than undesirable in the practice of the invention, they are not removed from the monomers prior to polymerization except when the particular application for which the product of the polymerization is intended requires the removal of one or more particular impurities known to contribute properties which would be undesirable in that application, e.g., excessive amounts of dissolved oxygen are removed when the application will not tolerate the degree of yellowness that would be contributed to the polymer by large amounts of oxygen.

The monovinyl aromatic monomer may constitute the only component of the polymerizable material or may be in admixture with lesser amounts of one or more copolymerizable monomers, such as acrylonitrile; methacrylonitrile; an alkyl methacrylate, e.g., the methyl, ethyl, propyl, and butyl methacrylates; the corresponding alkyl acrylates; alpha-alkyl-styrenes, e.g., alpha-methylstyrene, alpha-ethylstyrene, alpha-methyl-p-methylstyrene, etc.

When desired, the polymerizable material can have a rubbery conjugated 1,3-diene polymer (e.g., natural rubber, polybutadiene, polyisoprene, copolymers of butadiene and/or isoprene with lesser amounts of comonomers such as styrene, acrylonitrile, methyl methacrylate, etc.) dissolved therein, ordinarily in amounts of 1–25%, based on the weight of polymerizable material. Also, the reaction mixture can contain other optional ingredients such as plasticizers, mineral oils, stabilizers, etc.

The process of the invention is conducted at 180–220° C., preferably 180–200° C., during the finishing stage of the reaction because of the ineffectiveness of the benzoin/weak organic acid catalyst systems at lower temperatures. Prior to the finishing stage, the reaction can be conducted under any conditions suitable to the technique employed (e.g., a mass, suspension, batch, or continuous technique) and to the type of product desired. Thus, the process may be conducted at 180–220° C. throughout the reaction when a comparatively low molecular weight product is desired, whereas lower temperatures, e.g., 90° C., will be maintained for as long as is practical when a higher molecular weight product is desired. Methods of varying polymerization conditions to obtain a particular type of product are, of course, already well known to the art. As will be readily understood, the time at which the reaction temperature should be raised to the finishing temperature will vary with the conditions which have been employed during the earlier stages of the reaction, since some of these conditions normally lead to higher degrees of conversion than others. Ordinarily, the finishing temperature of 180–220° C. will be utilized at least during the stage of the reaction after 98% conversion of monomer to polymer.

A preferred embodiment of the invention is the use of the benzoin/weak organic acid catalyst systems in the mass polymerization of styrene-type monomers to moldable polymers having a minimum residual monomer content. In order for the product of this mass process to have the desired properties, a fairly specific time-temperature cycle should be employed. In the first stage of the reaction, polymerization is conducted at 75–125° C. for about 6–24 hours until 15–45% of the monomer has been converted to polymer; in the second stage, the reaction temperature is gradually raised from 75–95° C. to 180–200° C. over a period of about 3–7 hours; in the final stage, the reaction temperature is maintained at 180–200° C. for about 0.5–5 hours.

The manner of manipulating the reaction temperature during the first stage of the reaction in order to be in the 75–95° C. range for the beginning of the second stage of the reaction is not critical, e.g., an initial temperature of about 100–125° C. can be gradually lowered to 75–95° C. during the first stage of the reaction or the temperature can be maintained at 75–95° C. throughout the first stage of the reaction, etc. According to a particularly preferred embodiment of the invention, the reaction mixture is initially heated to 105–115° C. and maintained at a temperature gradually lowered to about 90° C. until about 25–45% conversion to polymer is obtained, after which the temperature is gradually raised to 180–200° C. over a period of about 3–7 hours and then maintained at 180–200° C. for about 2–5 hours to complete the reaction. Especially good results are also obtained by initially heating the reaction mixture at 90° C. to about 25–35% conversion, then heating at a temperature gradually raised to 180–200° C. over a period of about 4–5 hours, and finally heating at 180–200° C. for 2–4 hours.

Although also generally useful as a new catalytic method of polymerizing styrene-type monomers, the present invention is particularly advantageous in that it permits the formation by a mass process of moldable polystyrene-type materials having lower residual monomer contents than the comparable polymers of the prior art. The reduced residual monomer content improves the physical and molding properties of the polymers.

It is obvious that many variations can be made in the products and processes set forth above without departing from the spirit and scope of this invention.

What is claimed is:

1. A process which comprises (1) dissolving a catalyst mixture consisting of:
   (a) 0.02–0.08 part by weight of benzoin,
   (b) at least 0.05 part by weight of a monocarboxylic acid having a dissociation constant below $1.0 \times 10^{-4}$ at 25° C., and
   (c) up to 0.1 part by weight of a peroxy compound having a half-life of at least 10 hours in benzene at 100° C.
in 100 parts by weight of a polymerizable material of the group consisting of a monovinyl aromatic hydrocarbon, an ar-halo monovinyl aromatic hydrocarbon, mixtures thereof with one another, and mixtures thereof with lesser amounts of copolymerizable monomers and (2) heating to polymerize the polymerizable material; said process being conducted at 180–220° C. during the finishing stage of the reaction.

2. A mass polymerization process which comprises (1) dissolving a catalyst mixture consisting of:
   (a) 0.02–0.08 part by weight of benzoin,
   (b) at least 0.05 part by weight of a monocarboxylic acid having a dissociation constant below $1.0 \times 10^{-4}$ at 25° C., and
   (c) up to 0.1 part by weight of a peroxy compound having a half-life of at least 10 hours in benzene at 100° C.
in 100 parts by weight of a polymerizable material of the group consisting of a monovinyl aromatic hydrocarbon, an ar-halo monovinyl aromatic hydrocarbon, mixtures thereof with one another, and mixtures thereof with lesser amounts of copolymerizable monomers, (2) heating the polymerizable material at 75–125° C. until 15–45% conversion to polymer is obtained, the temperature being so regulated as to be in the 75–95° C. range when this conversion is obtained, (3) gradually raising the reaction temperature to 180–200° C. over a period of about 3–7 hours, and (4) maintaining the reaction temperature at 180–200° C. for about 0.5–5 hours.

3. The process of claim 2 wherein the polymerizable material is styrene.

4. The process of claim 2 wherein the polymerizable material is a mixture of styrene and alpha-methylstyrene.

5. The process of claim 2 wherein the polymerizable material is a mixture of styrene and acrylonitrile.

6. The process of claim 2 wherein the polymerizable material is a mixture of styrene and methyl methacrylate.

7. The process of claim 2 wherein the polymerizable material contains a dissolved rubbery conjugated 1,3-diene polymer.

8. The process of claim 2 wherein the monocarboxylic acid is an alkanoic acid containing 12–20 carbon atoms.

9. The process of claim 2 wherein the catalyst mixture consists of (a) 0.02–0.08 part by weight of benzoin and (b) 0.1–0.6 part by weight of a monocarboxylic acid having a dissociation constant below $1.0 \times 10^{-4}$ at 25° C.

10. The process of claim 2 wherein the catalyst mixture consists of (a) 0.02–0.08 part by weight of benzoin, (b) 0.1–0.6 part by weight of a monocarboxylic acid having a dissociation constant below $1.0 \times 10^{-4}$ at 25° C., and (c) 0.01–0.1 part by weight of a peroxy compound having a half-life of at least 10 hours in benzene at 100° C.

11. A mass polymerization process which comprises (1) dissolving a catalyst mixture consisting of (a) 0.02–0.08 part by weight of benzoin, (b) 0.1–0.6 part by weight of stearic acid, and (c) 0.01–0.05 part by weight of di-t-butyl peroxide in 100 parts by weight of styrene, (2) heating the monomer to 105–115° C. and then gradually lowering the temperature to about 90° C. to obtain 25–45% conversion to polymer, (3) gradually raising the temperature to 180–200° C. over a period of about 3–7 hours, and (4) maintaining the reaction temperature at 180–200° C. for 2–5 hours.

References Cited by the Examiner

UNITED STATES PATENTS

| | | | |
|---|---|---|---|
| 2,675,362 | 4/1954 | Shusman | 260—93.5 |
| 2,886,553 | 5/1959 | Stein et al. | 260—93.5 |

OTHER REFERENCES

Danilov et al., Chem. Abs., vol. 49 (1955), page 6116b.

JOSEPH L. SCHOFER, *Primary Examiner.*

JOSEPH R. LIBERMAN, *Examiner.*